(12) United States Patent
Zhao

(10) Patent No.: US 7,466,655 B1
(45) Date of Patent: Dec. 16, 2008

(54) ANT-BASED METHOD FOR DISCOVERING A NETWORK PATH THAT SATISFIES A QUALITY OF SERVICE EQUIPMENT

(75) Inventor: Fuyong Zhao, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 920 days.

(21) Appl. No.: 10/665,190

(22) Filed: Sep. 16, 2003

(51) Int. Cl.
H04L 1/00 (2006.01)

(52) U.S. Cl. ............... 370/238; 370/252; 370/392; 709/241

(58) Field of Classification Search ......... 370/229–238, 370/252–253, 389, 392; 709/223, 224, 238, 709/241, 242
See application file for complete search history.

(56) References Cited

U.S. PATENT DOCUMENTS

| 6,084,858 A * | 7/2000 | Matthews et al. ........... 370/238 |
| 2003/0072269 A1 | 4/2003 | Teruhi et al. |
| 2003/0202468 A1 * | 10/2003 | Cain et al. .................. 370/229 |
| 2003/0202479 A1 * | 10/2003 | Huang et al. ................ 370/252 |
| 2003/0204616 A1 * | 10/2003 | Billhartz t al. .............. 709/235 |
| 2005/0128944 A1 * | 6/2005 | Zhang et al. ................ 370/229 |

OTHER PUBLICATIONS

Apostolopoulos, G., et al., "QoS Routing Mechanisms and OSPF Extensions", Network Working Group, RFC 2676, Aug. 1999, 50 pages.

Moy, J., "OSPF Version 2", Network Working Group, RFC 2178, Cascade Communications Corp., Jul. 1997, 197 pages.

Zhao, Felix Cho, "ANTD: An Adaptive, Deterministic Ant Routing Algorithm", Cisco Systems, Document No. EDCS- 255496, Revision 0.1, dated Jul. 16, 2003, 38 pages.

Di Caro, Gianni, et al., "AntNet: Distributed Stigmergetic Control for Communications Networks", AI Access Foundation and Morgan Kaufmann Publishers, Journal of Artificial Intelligence Research 9, 1998, 49 pages.

S. Murphy, et al., "OSPF with Digital Signature," Jun. 1997, Network Working Group, Request for Comments: 2154, http://www.ietf.org/rfc/rfc2154.txt?number=2154, data retrieved Dec. 8, 2003, pp. 1-28.

(Continued)

Primary Examiner—Ricky Ngo
Assistant Examiner—Pao Sinkantarakorn
(74) Attorney, Agent, or Firm—Hickman Palermo Truong & Becker LLP

(57) ABSTRACT

An ant-based method for discovering a network path that satisfies a quality of service (QoS) requirement is disclosed. A "forward QoS ant," which indicates a destination and a QoS requirement, is received at a particular router. The forward QoS ant is updated to indicate the particular router's identity. Given a metric "X," such as delay, jitter, etc., it is determined whether a least-"X" path from the particular router to the destination satisfies the QoS requirement, and whether the forward QoS ant has visited any other routers in the least-"X" path. If the least-"X" path satisfies the QoS requirement and the forward QoS ant has not visited any other router in the least-"X" path, then the forward QoS ant is sent to the next router in the least-"X" path. Later, a "backward QoS ant," which indicates the path taken by the forward QoS ant, is received at the particular router.

18 Claims, 14 Drawing Sheets

OTHER PUBLICATIONS

David L. Mills, "Network Time Protocol (Version 3), Specification, Implementation and Analysis," Mar. 1992, Network Working Group, Request for Comments: 1305, http://www.ietf.org/rfc/rfc1305.txt?number=1305, data retrieved Dec. 8, 2003, p. 1-107.

Y. Rekhter, et al., "A Border Gateway Protocol 4 (BGP-4)," Mar. 1995, Network Working Group, Request for Comments: 1771, http://www.ietf.org/rfc/rfc1771.txt?number=1771, data retrieved Jun. 5, 2003, pp. 1-54.

Gianni Di Caro, et al., "AntNet: Distributed Stigmergetic Control for Communications Networks," Journal of Artifical Intelligence Research 9, submitted May 1998, published Dec. 1998, pp. 317-365.

Marco Dorigo, et al., "The Ant System: Optimization by a colony of cooperating agents," IEEE Transactions on Systems, Man, and Cybernetics-Part B, vol. 26, No. 1, 1996, pp. 1-26.

Ruud Schoonderwoerd, et al., "Ant-Based load balancing in telecommunications networks," pp. 1-26, May 21, 1996.

Felix Cho Zhao, Cisco Systems, Inc., "ANTD: An Adaptive, Deterministic Ant Routing Algorithm," 2003, Document No. EDCS-255496, pp. 1-38.

Eric Bonabeau, et al., "Swarm Smarts," Scientific American, Mar. 2000, pp. 72-79.

Dimitri Bertsekas, et al., "Data Networks," Prentice Hall, 1992, pp. 365-369 and 393-400.

Andrew S. Tanenbaum, "Computer Networks," Second Edition, Prentice Hall, 1996, pp. 345-365.

Malvin H. Kalos, et al., "Monte Carol Methods, vol. I: Basics," 1986, pp. 1-3 and 129-140.

Richard Bellman, "Dynamic Programming," Princeton University Press, Princeton, NJ, 1957, 362 pages.

C. Hedrick, "Routing Information Protocol," Jun. 1998, Network Working Group, Request for Comments: 1058, http://www.ietf.org/rfc/rfc1058.txt?number=1058, data retrieved Jan. 14, 2004, pp. 1-31.

J. Moy, "OSPF Version 2," Jul. 1991, Network Working Group, Request for Comments: 1247, http://www.ietf.org/rfc/rfc1247.txt?number=1247, data retrieved Jan. 14, 2004, pp. 1-76.

Bruce Davie, et al., "MPLS Technology and Applications," Morgan Kaufamann Publishers, 2000, 301 pages.

E. Crawley, et al., "A Framework for QoS-based Routing in the Internet," Aug. 1998, Network Working Group, Request for Comments: 2386, http://www.ietf.org/rfc/rfc2386.txt?number=2386, data retrieved Jan. 14, 2004, pp. 1-35.

G. Apostolopoulus, et al., "QoS Routing Mechanisms and OSPF Extensions," Aug. 1999, Network Working Group, Request for Comments: 2676, http://www.ietf.org/rfc/rfc2676.txt?number=2676, data retrieved Jan. 14, 2004, pp. 1-47.

J. Moy, "OSPF Version 2," Jul. 1997, Network Working Group, Request for Comments: 2178, http://www.ietf.org/rfc/rfc2178.txt?number=2178, data retrieved Dec. 8, 2003, pp. 1-197.

Shigang Chen, et al., "Distributed Quality of Service Routing in High-Speed Networks Based on Selective Routing," IEEE, 1998, pp. 80-89.

Kang G. Shin, et al., "Distributed Route Selection for Establishing Real-Time Channels," Aug. 30, 1999, pp. 1-29.

Hussein F. Salama, et al., "A Distributed Algorithm for Delay-Constrained Unicast Routing," IEEE, 1997, 8 pages.

Shigang Chen, et al., "An Overview of Quality-of-Service Routing for the Next Generation High Speed Networks: Problems and Solutions," pp. 1-19, 1998.

* cited by examiner

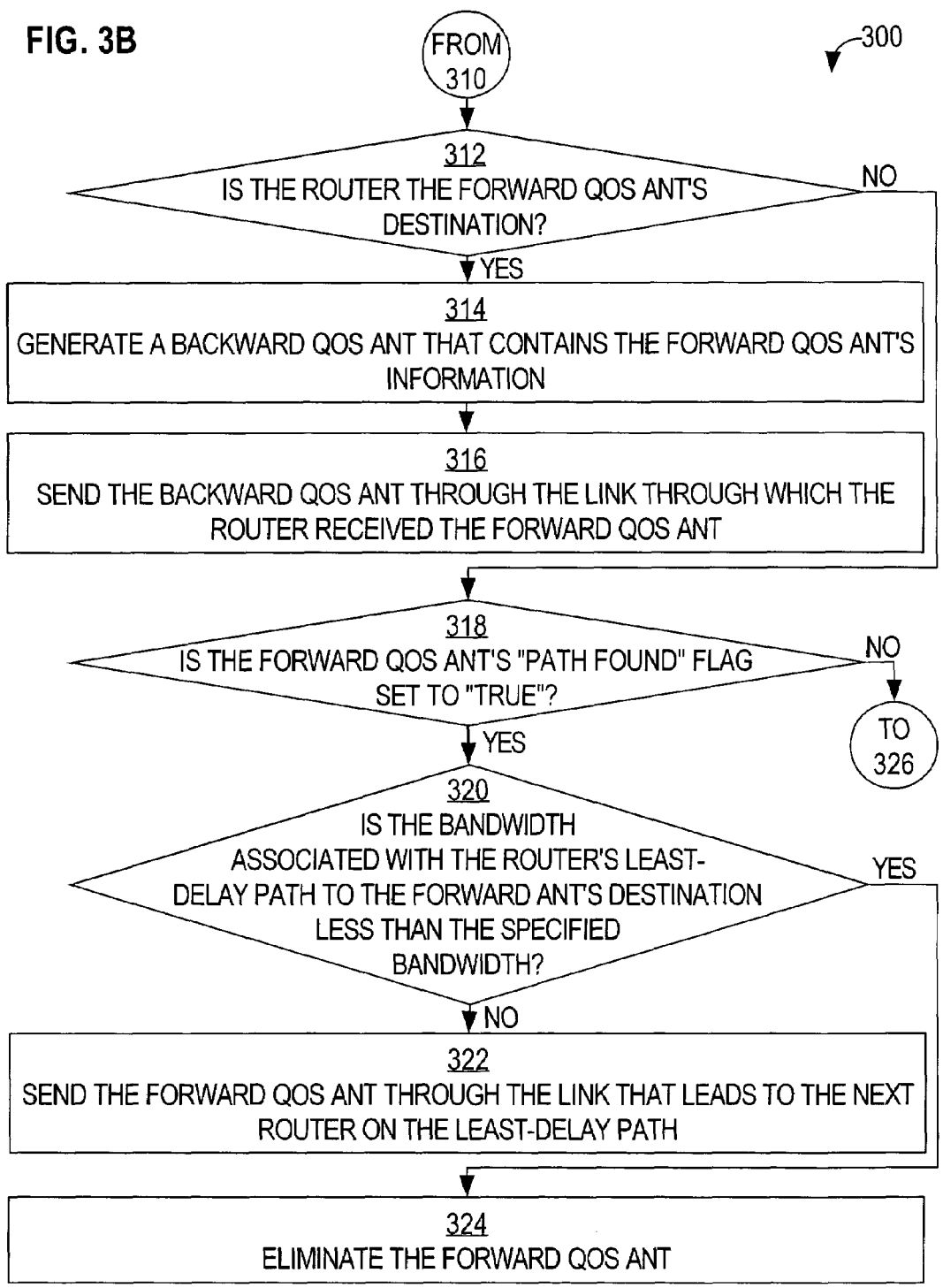

ANT-BASED METHOD FOR DISCOVERING A NETWORK PATH THAT SATISFIES A QUALITY OF SERVICE EQUIPMENT

RELATED APPLICATIONS

The present application is related to the following U.S. patent applications, the entire contents of which are incorporated herein by reference for all purposes:

U.S. patent application Ser. No. 10/382,639, filed on Mar. 5, 2003, entitled METHOD AND APPARATUS FOR UPDATING PROBABILISTIC NETWORK ROUTING INFORMATION, by Fuyong Zhao and Bruce Moon; and U.S. patent application Ser. No. 10/645,255, filed on Aug. 20, 2003, entitled ADAPTIVE, DETERMINISTIC ANT ROUTING APPROACH FOR UPDATING NETWORK ROUTING INFORMATION, by Fuyong Zhao.

FIELD OF THE INVENTION

The present invention generally relates to routing algorithms for computer networks. The invention relates more specifically to an ant-based method for discovering a network path that satisfies a quality of service (QoS) requirement.

BACKGROUND OF THE INVENTION

The approaches described in this section could be pursued, but are not necessarily approaches that previously have been conceived or pursued. Therefore, unless otherwise indicated herein, the approaches described in this section are not prior art to the claims in this application and are not admitted to be prior art by inclusion in this section.

Computers may communicate with each other through a network by sending data packets to each other. While there are numerous protocols according to which one computer may address a data packet to another computer, a protocol commonly used for this purpose is Internet Protocol (IP). Typically, a data packet that is structured according to IP (an "IP data packet") contains a source IP address and a destination IP address. By examining a destination IP address contained in an IP data packet, a network device can determine the identity of a computer to which the IP data packet ultimately should be transmitted.

The computer that originates an IP data packet (the "originating computer") is often not directly connected to the computer for which the IP data packet is destined (the "destination computer"). The originating computer and the destination computer often transmit IP data packets through several interconnected intermediate network devices, such as network routers. Each router maintains a routing table that contains information that the router uses to select one of potentially several directly connected network devices to which the router should forward an IP data packet. Because each such directly connected network device is connected to a router port, the router selects one of potentially several ports through which to forward the packet.

By communicating the information in their routing tables to other routers and updating their routing tables based on information received from other routers, routers can attempt to "learn" from each other the network routes, or paths, from different sources to different destinations. Routers communicate such routing table information using a routing protocol. Some examples of routing protocols are distance vector protocols, such as Routing Information Protocol (RIP), and link state protocols, such as Open Shortest Path First (OSPF) protocol. RIP is described in the Internet Engineering Task Force (IETF) Request For Comments (RFC) 1058. OSPF is described in IETF RFC 1247.

Thus, one computer may send a stream of data packets through a network route, or path, to another computer. However, depending on the nature of the information contained within the data packets, the entire stream of data packets may require transmission according to a specified minimum Quality of Service ("QoS"). A QoS may specify various requirements that are to be met when transmitting a particular stream. For example, a QoS may specify a minimum bandwidth, a maximum delay, a maximum jitter, a maximum packet loss rate, a minimum path reliability, and other requirements. Being larger and more time-critical in nature, a stream of data packets that contain real-time video information may be associated with a QoS that is more demanding than a QoS that is associated with a stream of data packets that contain portions of a low-priority, text-only e-mail message.

A stream of data packets that is associated with a specified QoS should be transmitted through a network path that satisfies the QoS requirements. A network path satisfies QoS requirements if a stream of data packets may be transmitted through that network path according to the QoS requirements. If no network path satisfies the QoS requirements, then the stream of data packets typically should not be transmitted. A path that satisfies the requirements of a particular QoS is called a "feasible path" relative to the particular QoS. Therefore, given a QoS request and a set of network paths, it is desirable to find a feasible path relative to the QoS. The process of finding a feasible path and sending a stream of data packets through the feasible path is called "QoS routing."

Traditionally, previous QoS routing approaches have been categorized either as "source" QoS routing approaches or as "distributed" QoS routing approaches. Generally, source routing approaches involve each source, such as routers, independently collecting information about the global state of a network. This "global state information" includes information about each link in the network, such as the amount of bandwidth available on each link. Once a source has collected the network's global state information, the source determines a feasible path by performing a series of algorithmic steps using the global state information. Each source independently determines a feasible path. An example of a source QoS routing approach is described as an extension to the OSPF protocol in IETF RFC 2676.

Several significant drawbacks are inherent in source routing approaches. Because each source sends and receives messages in collecting global state information, the network may be overwhelmed by massive quantities of messages that are sent to and from many sources. The number of such messages increases with the number of sources in the network. Thus, source routing approaches suffer from an inherent scalability problem. In order to maintain relatively current global state information, each source periodically collects updated global state information. As the period between such collections is decreased, the message overhead involved in such collections grows. As the period between such collections is increased, the global state information maintained by each source becomes less current and therefore less reliable, on average.

Additionally, the algorithmic steps performed by each source in order to determine a feasible path usually are computationally intense. The resources needed to perform such steps repeatedly at an acceptable speed come at a price. Because each source independently performs such steps, the expense of each source increases when source routing approaches are used.

To avoid some of the problems inherent in source QoS routing approaches, some distributed QoS routing approaches have been proposed. Unlike source QoS routing approaches, distributed QoS routing approaches generally do not centralize the task of determining a feasible path within a single source router. Distributed QoS routing approaches therefore do not require that each router independently maintain global state information. As a result, distributed QoS routing approaches typically are associated with lower computational and message overheads than those associated with source QoS routing approaches.

K.G. Shin and C.-C. Chou provided an example of a distributed QoS routing approach in "A Distributed Route-Selection Scheme for Establishing Real-Time Channels," *IFIP Sixth Int'l Conf. On High Performance Networking* (1995). This approach operates by flooding messages through all of the paths in a network. Unfortunately, such complete network flooding greatly increases message overhead, especially in large networks.

S. Chen and K. Nahrstedt provided another example of a distributed QoS routing approach in "Distributed Quality-of-Service Routing in High-Speed Networks Based on Selective Probing," University of Illinois at Urbana-Champaign, Tech. Rep. (1998). This approach floods messages through selected links that satisfy QoS requirements. However, the links are selected without any consideration of global state information. Consequently, a significant number of links is often selected, resulting in significant message overhead. H. F. Salama, D. S. Reeves, and Y. Viniotis provided yet another example of a distributed QoS routing approach in "A Distributed Algorithm for Delay-Constrained Unicast Routing," *IEEE INFOCOM'97* (1997). This approach sends a control message from a source toward a destination in order to construct a delay-constrained path. Because this approach directs the control message without any consideration of global state information, loops may occur in the control message's path. When such a loop occurs, the control message is sent back to the node from which the control message came. Such loop removal through backtracking significantly increases message overhead.

Based on the foregoing, there is a clear need for a method of discovering a feasible path in a manner that lacks the disadvantages inherent in the QoS routing approaches discussed above. More specifically, there is a need for a method of discovering a feasible path in a manner that reduces message and computational overhead, and in a manner that avoids loops.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A, 3B, and 3C are flow diagrams that illustrate one embodiment of a process for handling a forward QoS ant received from another router;

DETAILED DESCRIPTION OF THE PREFERRED EMBODIMENT

Figure 1:
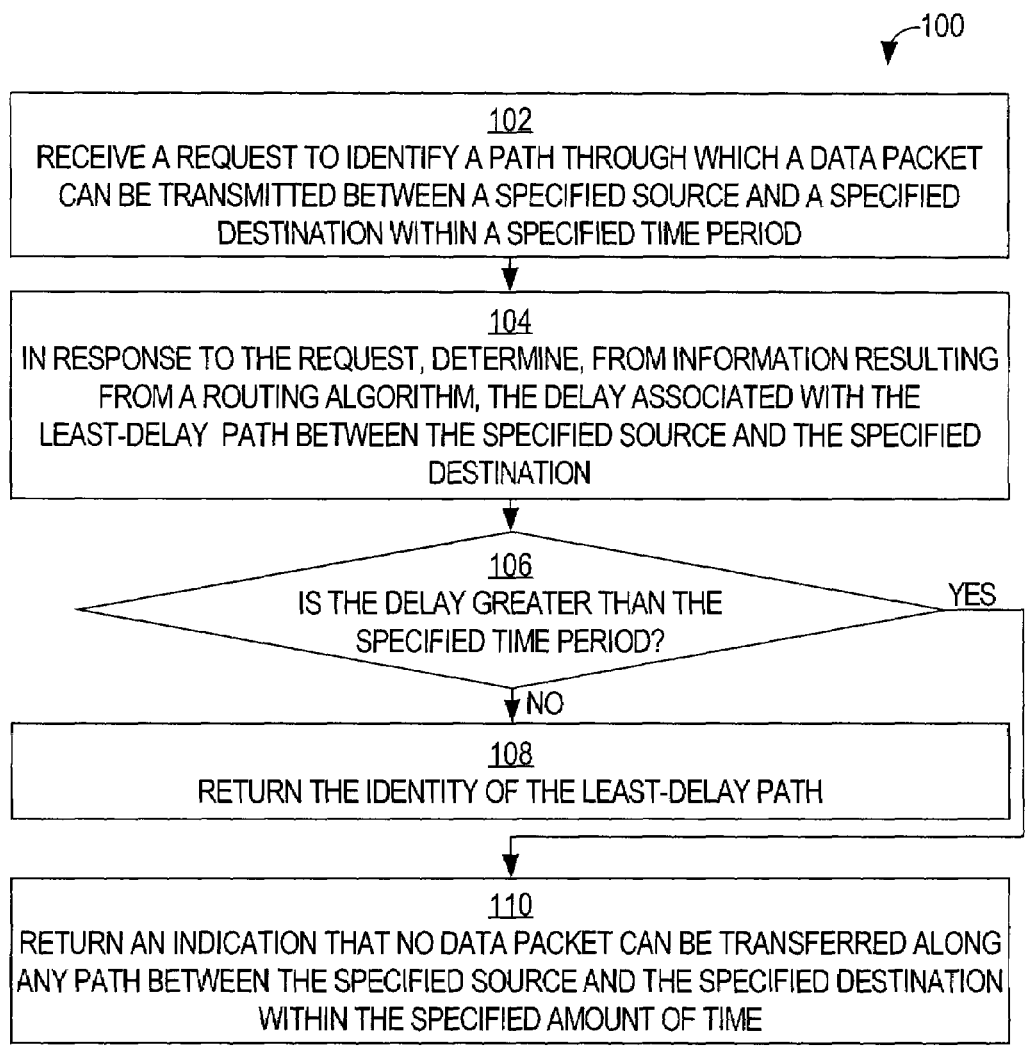
FIG. 1 is a flow diagram that illustrates a high level overview of one embodiment of a method that uses global state information to determine a network path that satisfies a delay requirement.

An ant-based method for discovering a network path that satisfies a quality of service (QoS) requirement is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
General Overview
Structural and Functional Overview
Using QoS Ants to Discover Best Feasible Paths
   3.1 Discovering a Least-Delay, Bandwidth-Constrained Path
   3.2 Discovering a Low-Cost, Delay-Constrained Path
   3.3 QoS Ant Structure
Implementation Mechanisms—Hardware Overview
Extensions and Alternatives 1.0 General Overview The needs identified in the foregoing Background, and other needs and objects that will become apparent from the following description, are achieved in the present invention, which comprises, in one aspect, an ant-based method for discovering a network path that satisfies a quality of service (QoS) requirement.

The least-delay path between a source and a destination is the path through which a data packet may be transferred between the source and the destination in the least amount of time, or, in other words, with the least amount of delay, relative to other paths between the source and the destination. Co-pending U.S. patent application Ser. No. 10/645,255, entitled ADAPTIVE, DETERMINISTIC ANT ROUTING APPROACH FOR UPDATING NETWORK ROUTING INFORMATION, describes a routing algorithm, referred to herein as the "Ant Routing Algorithm," for determining a least-delay path between a source and a destination using "ant" data packets, referred to herein as "ants."

According to the Ant Routing Algorithm, forward ants are sent out from a source. Each forward ant explores a path to the destination. As a forward ant travels a path, the forward ant records the identities of the routers along the path. The forward ant also records characteristics of the path, such as the time taken to travel between routers, and the available bandwidth of links between routers. When a forward ant reaches the destination, a corresponding backward ant, which indicates both the path taken by the forward ant and the characteristics of the path, is generated and sent back on the reverse path of the forward ant. As the backward ant travels back toward the source of the forward ant, the backward ant updates routers' "pheromone tables" based on the characteristics recorded by the forward ant. As a result of such updating, routers' pheromone tables reflect characteristics of least-delay paths between sources and destinations.

According to one aspect of a method described herein, ants are used to discover a source-to-destination path that satisfies one or more specified QoS requirements. A new kind of ant, called a "forward QoS" ant, is sent router-by-router from a source toward a specified destination. The forward QoS ant indicates both the specified destination and the specified QoS requirements. When a router receives a forward QoS ant, the router consults the path characteristics contained in the router's pheromone table. By comparing the path characteristics with the forward QoS ant's specified QoS requirements, the router is able to determine which of the router's links are associated with paths that lead to the destination and satisfy the specified QoS requirements. Based on the comparison, the router selects one or more links and sends one or more copies of the forward QoS ant through the selected links. The forward QoS ants are not sent along paths that do not satisfy the QoS requirements.

When a forward QoS ant reaches the specified destination, a corresponding "backward QoS" ant is generated. Information from the forward QoS ant is copied into the backward QoS ant. The backward QoS ant is sent, based on the information, router-by-router along the reverse of the path taken by the forward QoS ant. The backward QoS ant eventually reaches the source of the forward QoS ant. From the information carried by the backward QoS ant, the source obtains a source-to-destination path that satisfies the specified QoS requirements. Forward QoS ants and backward QoS ants differ from regular forward ants and regular backward ants that are used by the Ant Routing Algorithm.

Because forward QoS ants are not sent along paths that do not satisfy the QoS requirements, the network is not flooded with unnecessary messages. Because the paths through which forward QoS ants are sent are selected based on global state information previously obtained through a routing algorithm, forward QoS ants do not need to find paths to a specified destination, thus reducing the number of forward QoS ants that need to be sent. Available global state information already indicates loop-free paths between sources and destinations, so forward QoS ants are not sent in loops.

The foregoing method does not require each router to separately determine source-to-destination paths by repeatedly performing computationally intense algorithmic steps. Therefore, the foregoing method does not require as many computational resources as those required by source QoS routing techniques.

Furthermore, while the foregoing method can work in synergy with the Ant Routing Algorithm, the foregoing method also is flexible enough to work in tandem with other routing algorithms that determine least-delay paths in different ways. For example, the foregoing method can use least-delay paths discovered with OSPF. However, working in tandem in this manner is not required.

In other aspects, the invention encompasses a computer apparatus and a computer-readable medium configured to carry out the foregoing method.

2.0 Structural and Functional Overview

As described above, global state information resulting from a routing algorithm may be used to determine a source-to-destination path that satisfies one or more specified QoS requirements. FIG. 1 is a flow diagram that illustrates a high level overview of one embodiment of a method 100 that uses such global state information to determine a network path that satisfies a delay requirement. It will be seen below that where only a delay requirement is specified, forward QoS ants and backward QoS ants are not needed. Instead, available global state information, such as delay information obtained by forward ants and backward ants, may be used to find a path that satisfies the delay requirement. A network device such as a router may perform method 100.

In block 102, a request to identify a path through which a data packet can be transmitted between a specified source and a specified destination within a specified time period is received. For example, an application executing on an originating computer may request a connection to a destination computer. The application may specify that the delay associated with the connection needs to be no more than a specified amount of time, such as 100 milliseconds. A router may receive such a request from the application.

In block 104, in response to the request, the delay associated with the least-delay path between the specified source and the specified destination is determined from information resulting from a routing algorithm. For example, in response to the request, a router may consult the router's pheromone table. Using the specified source and destination as a key, the router may find, within the pheromone table, a least-delay path between the specified source and the specified destination. A delay is associated with the least-delay path in the pheromone table. This delay is the time taken for a forward ant to travel the least-delay path. The information in the pheromone table is global state information that is updated by ants according to the Ant Routing Algorithm.

In block 106, it is determined whether the delay associated with the least-delay path between the specified source and the specified destination is greater than the specified time period. If the delay associated with the least-delay path is not greater than the specified time period, then control passes to block 108. Otherwise, control passes to block 110.

In block 108, the identity of the least-delay path is returned. The identity typically comprises the identities of the routers along the least-delay path. By definition, no other path between the specified source and the specified destination could be associated with a lower delay than the delay associated with the least-delay path indicated in the pheromone table. Therefore, there is no need to examine other paths between the specified source and the specified destination after it is determined that the least-delay path satisfies the delay requirement. When the identity of the least-delay path is returned, the connection between the specified source and the specified destination is accepted.

Alternatively, in block 110, an indication of failure is returned. The indication is that no data packet can be transferred along any path between the specified source and the specified destination within the specified amount of time. If the least-delay path cannot satisfy the delay requirement, then no other path can. Therefore, there is no need to examine other paths between the specified source and the specified destination after determining that the least-delay path fails to satisfy the delay requirement. When the indication of failure is returned, the request for a connection between the specified source and the specified destination is rejected.

Figure 8:
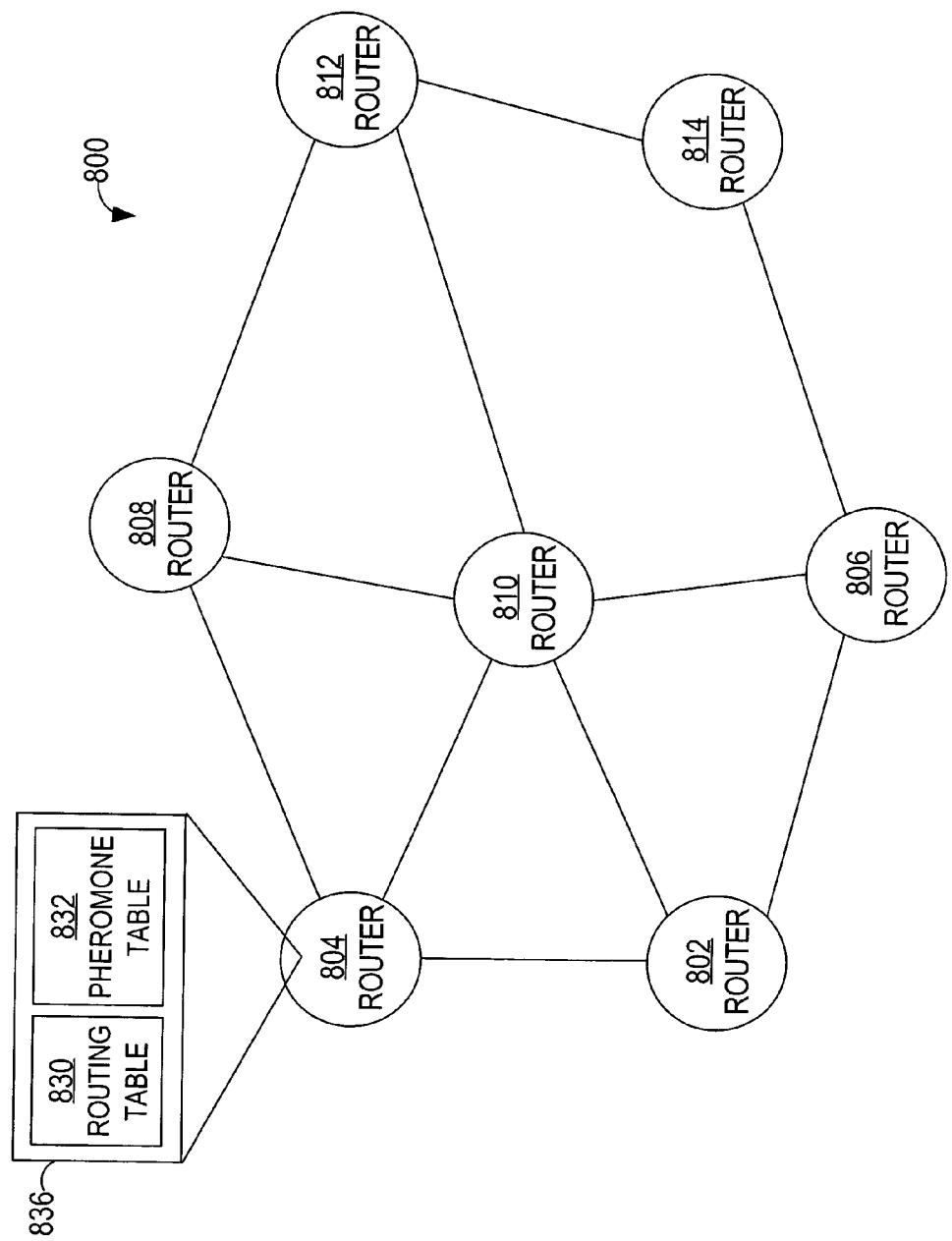
FIG. 8 shows an example network to which an embodiment may be applied.

FIG. 8 shows an example network to which method 100 may be applied. In FIG. 8, various routers 802-814 are coupled communicatively through various links to various others of the routers. Router 804 comprises routing information 836. Routing information 836 comprises a routing table 830 and a pheromone table 832. The other routers shown also comprise similar but separate routing information. An example of router 804 performing method 100 follows.

Router 804 receives a request to identify a path from router 804 to router 814. The request indicates that the identified path needs to be associated with a delay of less than 100 milliseconds. In response to the request, router 804 determines from pheromone table 832 that the least-delay path from router 804 to router 814 comprises the following sequence of routers: router 804, router 810, router 806, and router 814. Router 804 determines from pheromone table 832 that the delay associated with this least-delay path is 90 milliseconds. Because 90 milliseconds is less than the 100-millisecond requirement, router 804 returns the identity of the least-delay path as the response to the request.

Thus, delay-constrained paths may be determined based on global state information gathered by the Ant Routing Algorithm. Because such paths may be determined based on global state information that is already available, there is no need for sending out additional messages that could cause network congestion.

Furthermore, by modifying the Ant Routing Algorithm to gather information about characteristics other than delay, paths constrained by requirements other than delay requirements also may be determined. For example, the Ant Routing Algorithm may be modified or enhanced to send out forward ants that record the costs associated with links that the forward ants travel. Each such cost might be based on some measurement other than delay. For example, the cost associated with a link might be based on the jitter associated with the link. For another example, the cost associated with a link might be based on an actual monetary price of using the link.

While the above technique can be used to find a path that satisfies a QoS requirement such as delay, sometimes it is desirable to find, among multiple paths that satisfy one or more QoS requirements, a "best" path relative to some metric. For example, it may be useful to find, among multiple paths that satisfy a bandwidth requirement, the path associated with the least delay. For another example, it may be useful to find, among multiple paths that satisfy a delay requirement, the path associated with the least cost. Such paths may be called "best feasible" paths because they are the best of possibly many feasible paths. As is described below, QoS ants may be used to find such paths.

3.0 Using QoS Ants to Discover Best Feasible Paths 3.1 Discovering a Least-Delay, Bandwidth-Constrained Path Each QoS requirement is based on some metric, such as bandwidth or delay. A given metric may be categorized as either a "concave metric" or an "additive metric." Bandwidth is an example of a concave metric. The maximum bandwidth associated with a path is the minimum bandwidth of all bandwidths associated with links within the path. Delay and cost are examples of additive metrics. The delay associated with a path is the sum of all delays associated with links within the path. Similarly, the cost associated with a path is the sum of all costs associated with links within the path.

Figure 2A:
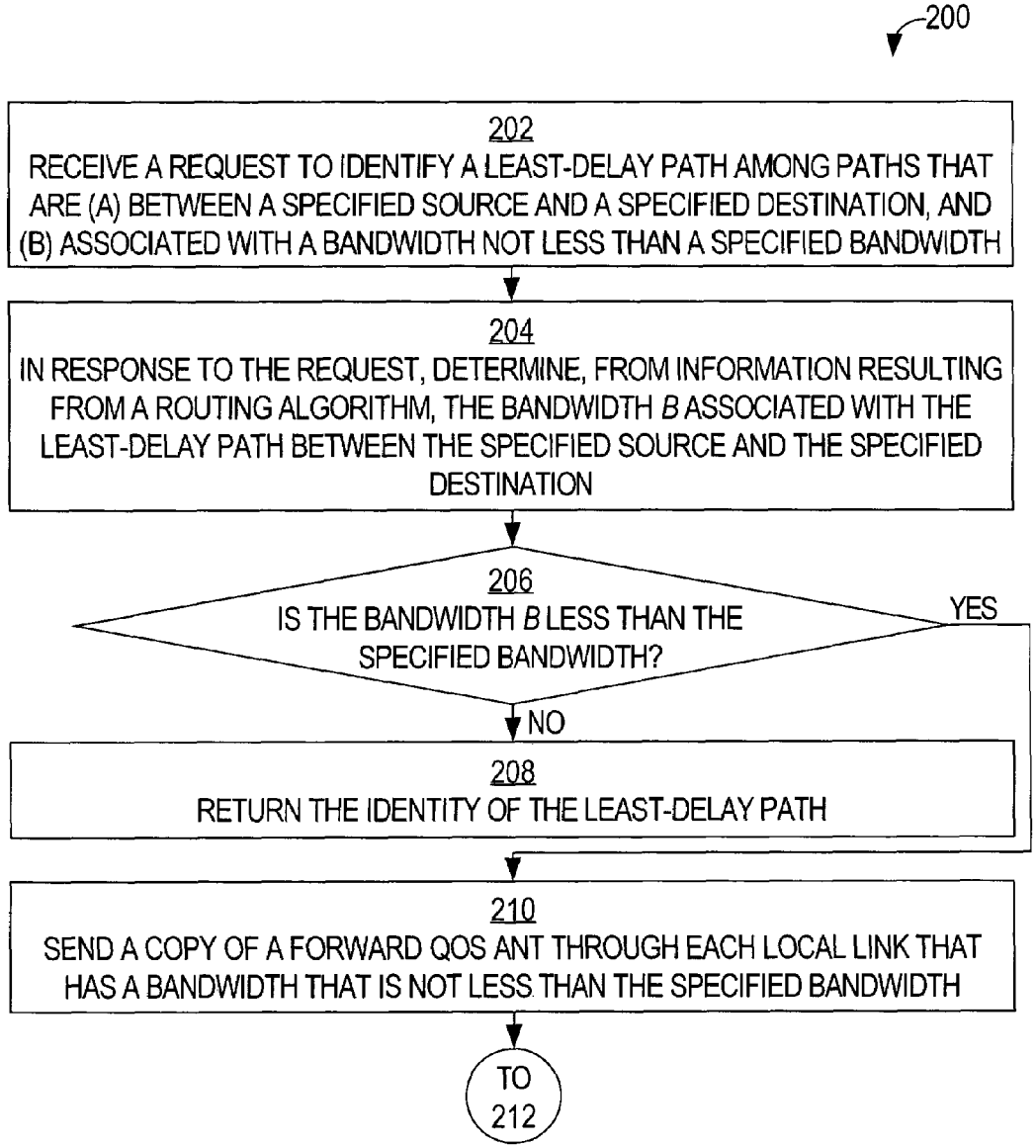
FIGS. 2A and 2B are flow diagrams that illustrate one embodiment of a method of determining a least-delay, specified-bandwidth-constrained path between a specified source and a specified destination.
Figure 2B:
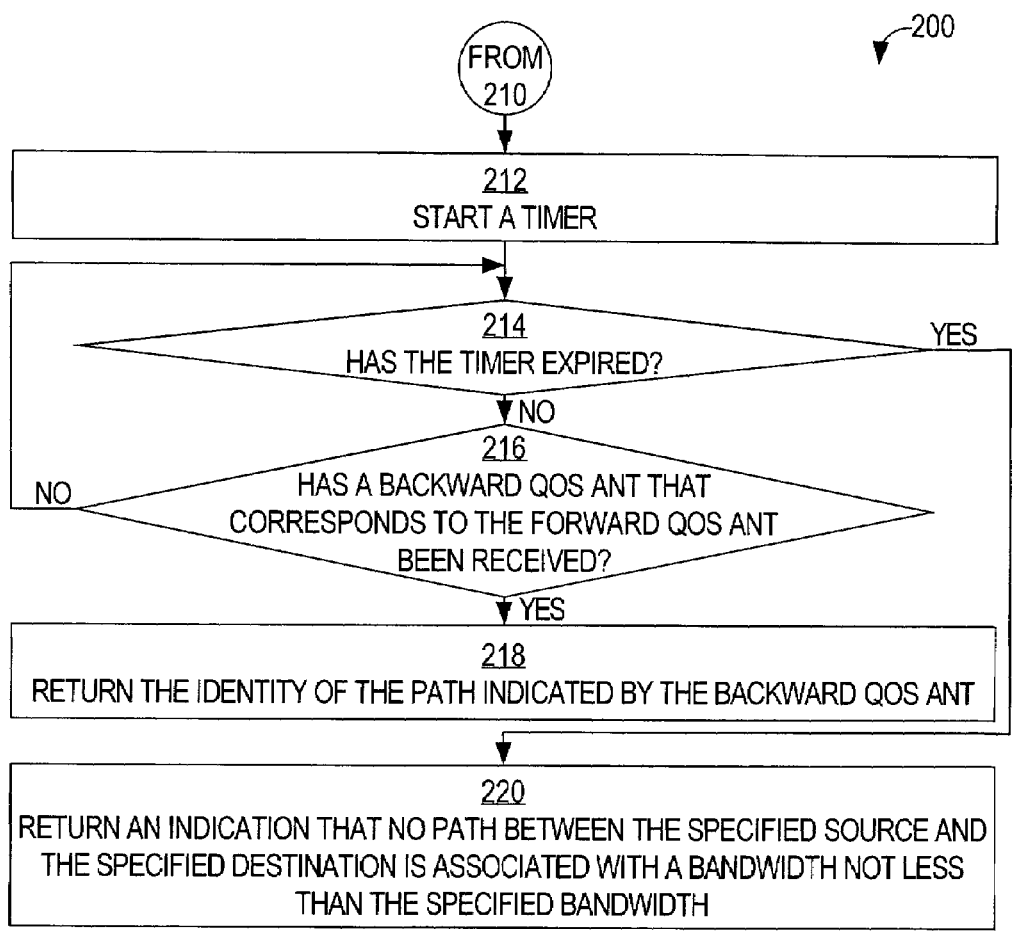

FIGS. 2A and 2B are flow diagrams that illustrate one embodiment of a method 200 of determining a least-delay, specified-bandwidth-constrained path between a specified source and a specified destination. In other words, among paths that satisfy the source, destination, and bandwidth requirements, the path associated with the least of delays associated with those paths is determined. Method 200 may be applied to QoS requirements that are based on concave metrics other than bandwidth. Bandwidth is used herein solely for purposes of example and explanation, and not as a limitation or requirement.

In block 202, a request is received. The request is to identify a least-delay path among path that are (a) between a specified source and a specified destination, and (b) associated with a bandwidth not less than a specified bandwidth. For example, router 804 may receive a request to identify a path that leads from router 804 to router 814 and is associated with at least the specified amount of bandwidth.

In block 204, in response to the request, the bandwidth B associated with the least-delay path between the specified source and the specified destination is determined from information resulting from a routing algorithm. For example, router 804 may determine, from pheromone table 832, the least-delay path from router 804 to router 814. The information in pheromone table 832 results from the Ant Routing Algorithm. Pheromone table 832 indicates the least-delay path between router 804 and router 814, as well as the bandwidth associated with the least-delay path.

In block 206, it is determined whether bandwidth B is less than the specified minimum bandwidth indicated in the request. If bandwidth B is not less than the specified minimum bandwidth, then control passes to block 208. Otherwise, control passes to block 210.

In block 208, the identity of the least-delay path is returned. The least-delay path satisfies the specified bandwidth requirement. Among paths between the specified source and the specified destination, no other path can be associated with a lesser delay than the least-delay path. Therefore, when the least-delay path satisfies the bandwidth requirement, there is no need to search for other paths.

In block 210, a copy of a forward QoS ant is sent through each local link that has a bandwidth that is not less than the specified bandwidth. No copies of the forward QoS ant are sent through links that do not satisfy the specified bandwidth. For example, router 804 has three local links: the link to router 802, the link to router 808, and the link to router 810. If the links to routers 802 and 810 satisfy the bandwidth requirement but the link to router 808 does not, then router 804 only sends copies of a forward QoS ant through the links to routers 802 and 810.

Each copy of the forward QoS ant indicates the identity of the router from which the forward QoS ant originated, the time at which the forward QoS ant was sent, the specified destination, the specified bandwidth requirement, a "path found" flag, and a "QoS identifier." Each copy of a particular forward QoS ant carries the same QoS identifier. For example, the QoS identifier may be based on the specified source, the specified destination, and an identity of the request received in block 202. The "path found" flag of each copy of the forward QoS ant initially is set to "false."

In block 212, a timer is started. For example, router 804 may start a 3 second timer that is associated with the QoS identifier of the forward QoS ant.

In block 214, it is determined whether the timer started in block 212 has expired. If the timer has not expired, then control passes to block 216. Otherwise, control passes to block 220.

In block 216, it is determined whether a backward QoS ant that corresponds to the forward QoS ant has been received. For example, by examining the QoS identifier of each received backward QoS ant, router 804 may determine whether a backward QoS ant that carries the same QoS identifier as the forward QoS ant has been received. The process by which backward QoS ants are generated is described below with reference to FIGS. 3A, 3B, and 3C. If a backward QoS ant that corresponds to the forward QoS ant has been received, then control passes to block 218. Otherwise, control passes back to block 214. It should be noted that other actions may be performed while the timer is running.

In block 218, the identity of the path indicated by the backward QoS ant is returned. This is the path taken by the corresponding forward QoS ant to the specified destination. Due to the process by which forward QoS ants are routed and backward QoS ants are generated, as described below with reference to FIGS. 3A, 3B, and 3C, the path taken by the forward QoS ant and carried by the corresponding backward QoS ant is guaranteed to be the least-delay specified-source-to-specified-destination path that satisfies the specified bandwidth requirement.

Alternatively, in block 220, an indication of failure is returned due to the expiration of the timer without the receipt of a corresponding backward QoS ant. The indication is that no path between the specified source and the specified destination is associated with a bandwidth that is not less than the specified bandwidth. Thus, a request for a connection that requires the specified bandwidth should be denied.

Figure 3A:
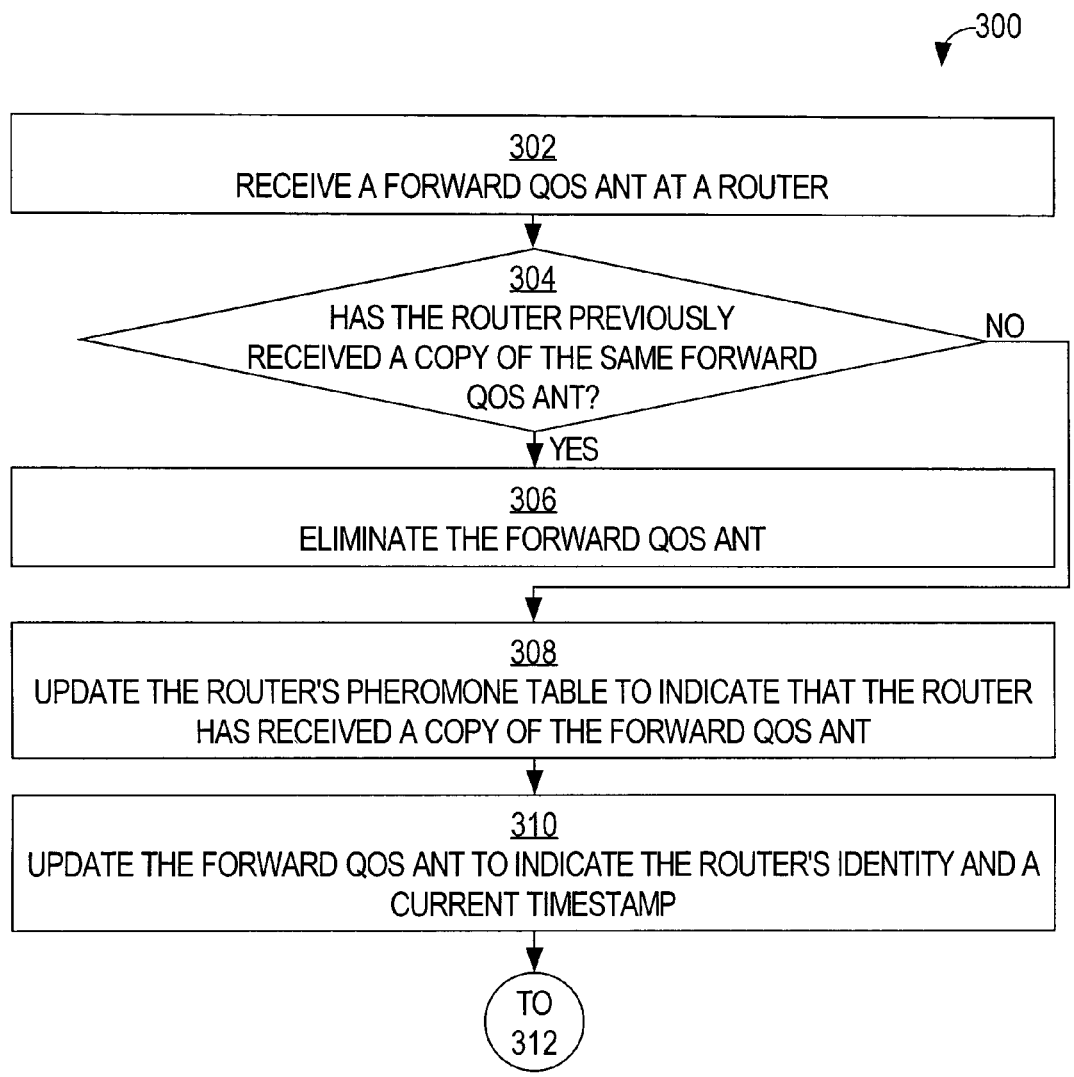
Figure 3C:
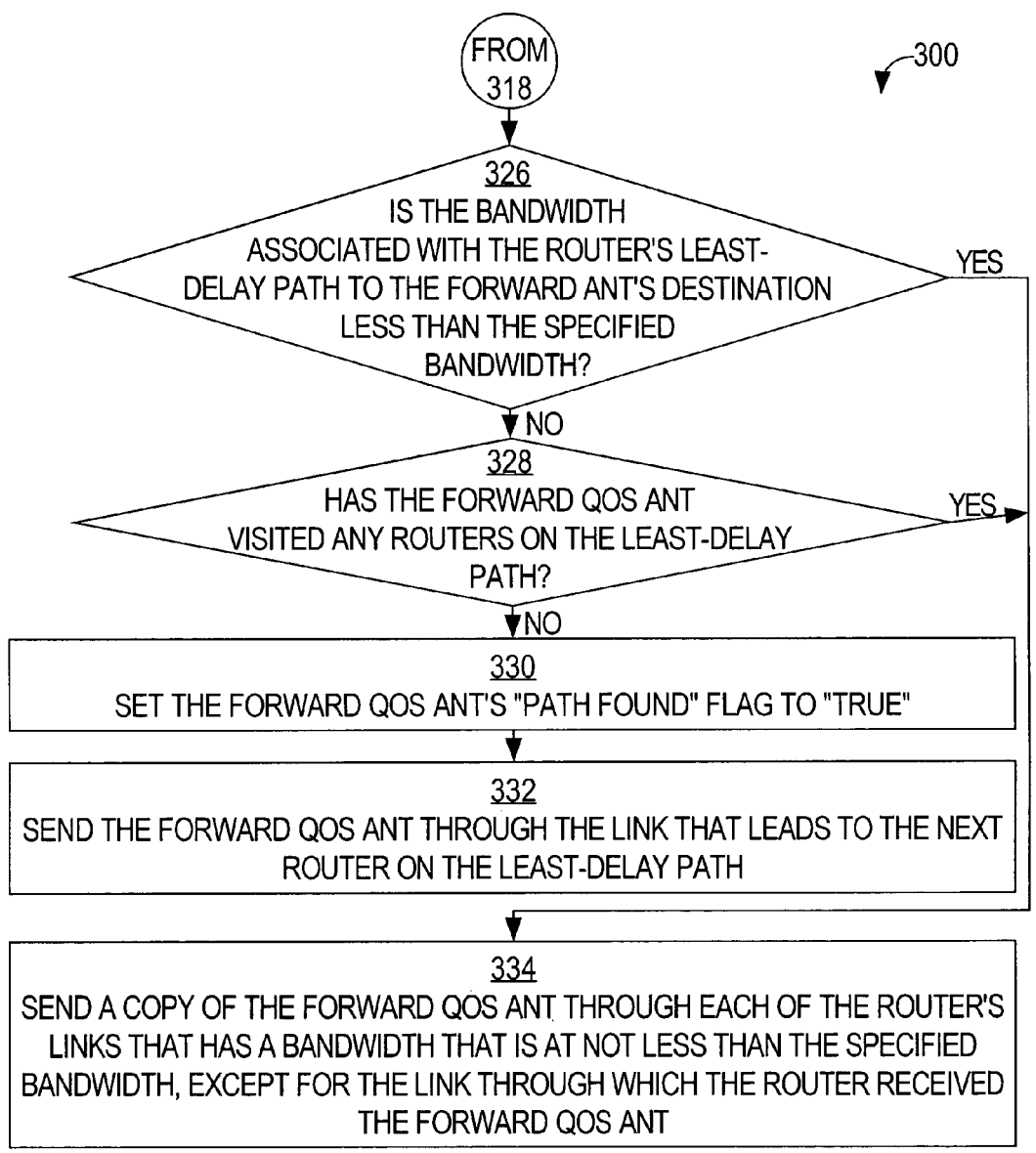

Between the time that one or more copies of a forward QoS are sent from an origin and the time that a corresponding backward QoS ant returns to the origin, multiple routers intermediate to the specified source and the specified destination may receive and forward copies of a forward QoS ant. FIGS. 3A, 3B, and 3C are flow diagrams that illustrate one embodiment of a process 300 for handling a forward QoS ant that is received from another router.

In block 302, a forward QoS ant is received at a router ("the present router"). For example, router 802 may receive a copy of a forward QoS ant that was sent from router 804.

In block 304, it is determined whether the present router previously has received a copy of the same forward QoS ant. For example, router 808 may consult its own pheromone table to determine whether an entry corresponding to the forward QoS ant's QoS identifier exists. The presence of such an entry in the pheromone table of router 808 indicates that the router already has received a copy of that particular forward QoS ant. If the present router previously has received a copy of the forward QoS ant, then control passes to block 306. Otherwise, control passes to block 308.

In block 306, in response to determining that the present router already has received a copy of the same forward QoS ant, the forward QoS ant is eliminated. That copy of the forward QoS ant is not forwarded to any other router. A copy of the same forward QoS ant already has been sent to another router. By eliminating later copies of the same forward QoS ant, network congestion is reduced. No more than one copy of a particular forward QoS ant needs to travel a particular path to a specified destination. This does not prevent multiple copies of the same forward QoS ant from traveling multiple different paths toward the specified destination. This also does not prevent a copy of a different forward QoS ant, having a different QoS identifier, from traveling the same path to the specified destination.

Alternatively, in block 308, the present router's pheromone table is updated to indicate that the router has received a copy of the forward QoS ant. For example, router 808 may add, to its own pheromone table, an entry that indicates the QoS identifier of the forward QoS ant. Based on such entries, later copies of the same forward QoS ant may be eliminated, thus reducing message overhead. The entry may be associated with an expiration time, after which the entry is removed from the pheromone table. This helps keep the pheromone table at a reasonable size.

In block 310, the forward QoS ant is updated to indicate the present router's identity and a current timestamp. For example, router 808 may add the router's identity and the current time to the end of a list contained in the forward QoS ant. As the forward QoS ant travels from router to router, the forward QoS ant records the time taken to reach each successive router and also the identities of the routers along the path that the forward QoS ant travels. The forward QoS ant indicates the order in which the forward QoS ant visited each router along the path.

In block 312, it is determined whether the present router is the forward QoS ant's specified destination. If the present router is the forward QoS ant's specified destination, then control passes to block 314. Otherwise, control passes to block 318.

In block 314, in response to determining that the present router is the forward QoS ant's specified destination, a backward QoS is generated. The backward QoS ant contains the forward QoS ant's information, including the path traveled by the forward QoS ant and the time taken to travel that path. Because copies of the same forward QoS ant that arrive at a destination router later than the first-arriving copy of that forward QoS ant are eliminated, a backward QoS ant is generated only in response to the first receipt of a copy of a particular forward QoS ant. As a result, the backward QoS ant indicates the least-delay path to the specified destination. It should be noted that this does not prevent generating different backward QoS ants for different forward QoS ants having different QoS identities.

In block 316, the backward QoS ant is sent through the link through which the present router received the forward QoS ant. For example, if router 812 received the forward QoS ant from router 808, then router 812 sends the corresponding backward QoS ant to router 808. The backward QoS ant travels the reverse of the path traveled by the corresponding forward QoS ant, as indicated by the information contained in the backward QoS ant.

Alternatively, in block 318, in response to determining that the present router is not the forward QoS ant's destination, it is determined whether the forward QoS ant's "path found" flag is set to "true." If the forward QoS ant's "path found" flag is set to "true," then control passes to block 320. Otherwise, control passes to block 326.

In block 320, in response to determining that the forward QoS ant's "path found" flag is set to "true," it is determined whether the bandwidth associated with the present router's least-delay path to the forward QoS ant's destination is less than the specified minimum bandwidth. For example, this determination may be made based on information contained in the present router's pheromone table. Such information may be stored in the pheromone table as a result of the Ant Routing Algorithm. If the bandwidth associated with the least-delay path is not less than the specified minimum bandwidth, then control passes to block 322. Otherwise, control passes to block 324.

In block 322, in response to determining that the bandwidth associated with the least-delay path is not less than the specified minimum bandwidth, the forward QoS ant is sent through the link that leads to the next router on the least-delay path. Because the pheromone table indicates all routers in a least-delay path, the next router on the least-delay path can be determined by examining the pheromone table.

Alternatively, in block 324, the forward QoS ant is eliminated.

In block 326, in response to determining in block 318 that the forward QoS ant's "path found" flag is not set to "true," it is determined whether the bandwidth associated with the present router's least-delay path to the forward QoS ant's destination is less than the specified minimum bandwidth. If the bandwidth associated with the least-delay path is not less than the specified minimum bandwidth, then control passes to block 328. Otherwise, control passes to block 334.

In block 328, in response to determining that the bandwidth associated with the least-delay path is not less than the specified minimum bandwidth, it is determined whether the forward QoS ant has visited any routers on the least-delay path, not including the present router. Routers on the least-delay path are indicated in the pheromone table. Routers that the forward QoS ant has visited are indicated in the forward QoS ant. If the forward QoS ant has not visited any routers on the least-delay path, not including the present router, then control passes to block 330. Otherwise, control passes to block 334.

In block 330, the forward QoS ant's "path found" flag is set to "true."

In block 332, the forward QoS ant is sent through the link that leads to the next router on the least-delay path.

Alternatively, in block 334, a copy of the forward QoS ant is sent through each of the present router's links that has a bandwidth that is not less than the specified bandwidth, except that a copy of the forward QoS ant is not sent through the link through which the present router received the forward QoS ant.

Figure 4:
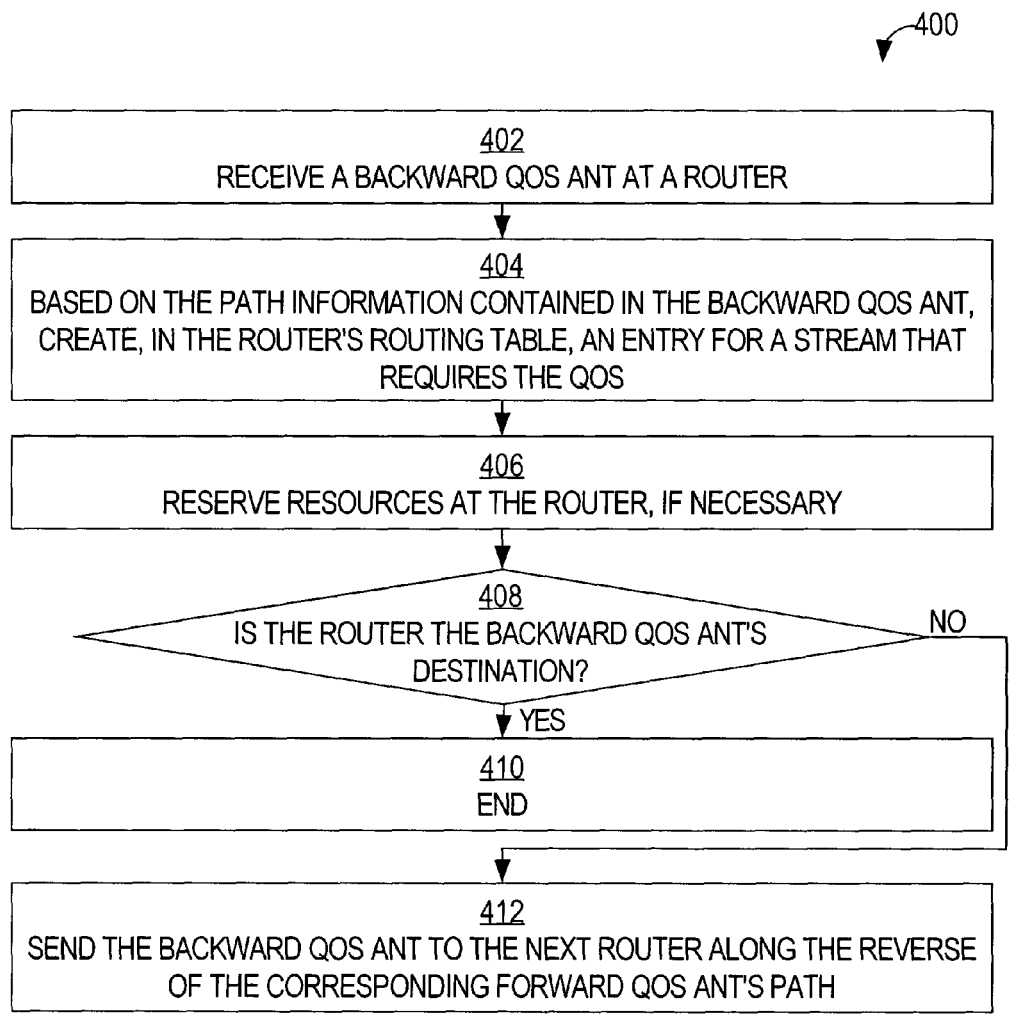
FIG. 4 is a flow diagram that illustrates one embodiment of a process for handling a backward QoS ant received from another router.

As described above with reference to block 316, a backward QoS ant travels the reverse of the path traveled by the corresponding forward QoS ant. FIG. 4 is a flow diagram that illustrates one embodiment of a process 400 for handling a backward QoS ant received from another router.

In block 402, a backward QoS ant is received at a router ("the present router").

In block 404, based on the path information contained in the backward QoS ant, an entry for a stream that requires the QoS is created in the present router's routing table. For example, in response to receiving a backward QoS ant with a particular QoS identity, router 804 may create, in routing table 830, an entry that indicates that data packets belonging to the stream associated with the particular QoS identity are to be forwarded to the next router along the path indicated by the backward QoS ant. Thus, data packets associated with a particular stream may be forwarded differently than data packets not associated with any particular stream.

In block 406, resources are reserved at the present router, if necessary. It is possible that some streams may require that routers along the path associated with the stream reserve bandwidth and other resources to guarantee the QoS specified by the backward QoS ant. Thus, when a router receives a backward QoS ant, the router may reserve such resources for data packets associated with the backward QoS ant's QoS identifier.

In block 408, it is determined whether the present router is the backward QoS ant's destination. The present router is the backward QoS ant's destination if the present router originally sent the corresponding forward QoS ant. If the present router is the backward QoS ant's destination, then process 400 ends in block 410. The present router may return the identity of the path indicated by the backward QoS ant as described above with reference to block 218 of FIG. 2. If the present router is not the backward QoS ant's destination, then control passes to block 412.

In block 412, the backward QoS ant is sent to the next router along the reverse of the corresponding forward QoS ant's path. For example, if router 808 received a forward QoS ant from router 804, then router 808 sends the corresponding backward QoS ant to router 804.

By sending a backward QoS ant to the source of the corresponding forward QoS ant, the source receives the identity of a best feasible path to the specified destination. Furthermore, any resources that need to be reserved along the best feasible path may be reserved in response to receiving a backward QoS ant.

3.2 Discovering a Low-Cost, Delay-Constrained Path

As described above in section 3.1, a QoS requirement may be based on either a concave metric or an additive metric. Both delay and cost are examples of additive metrics. Because delay and cost are both additive metrics, finding a least-cost, delay-constrained path is computationally difficult. The time to find the most additive-metric-optimal path that satisfies an additive-metric-constraint may be impractical. In order to discover a satisfactory path in reasonable time, an approximation may be made.

Figure 5:
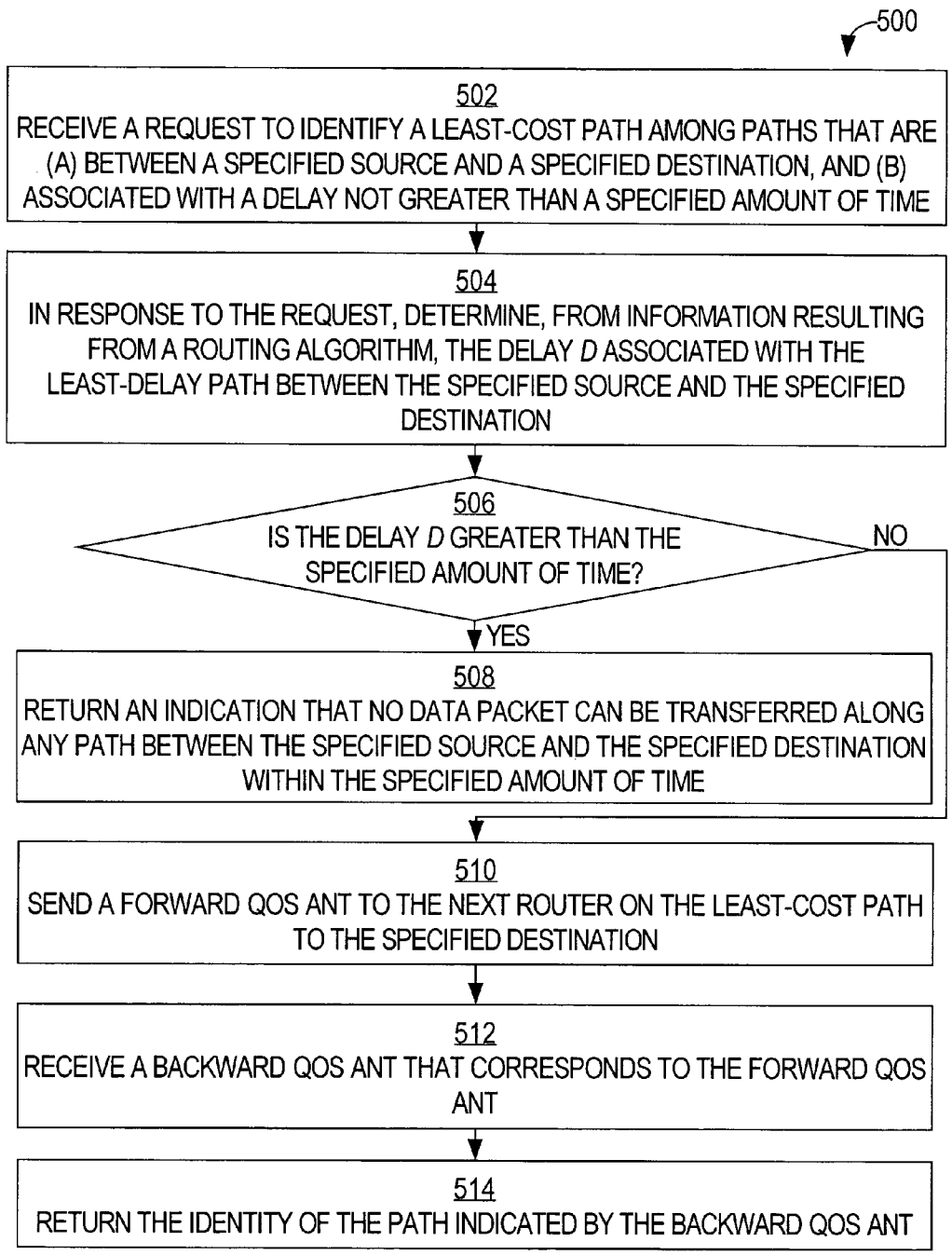
FIG. 5 is a flow diagram that illustrates one embodiment of a method of determining a low-cost, specified-delay-constrained path between a specified source and a specified destination.

FIG. 5 is a flow diagram that illustrates one embodiment of a method 500 of determining a low-cost, specified-delay-constrained path between a specified source and a specified destination. In other words, among paths that satisfy the source, destination, and delay requirements, a path associated with a low cost is determined. It should be noted that method 500 may be applied to QoS requirements that are based on additive metrics other than cost and delay. Cost and delay are used herein for purposes of example and explanation and not as requirements.

In block 502, a request is received. The request is to identify a least-cost path among paths that are (a) between a specified source and a specified destination, and (b) associated with a delay not greater than a specified amount of time (the "delay requirement"). For example, router 804 may receive a request to identify a least-cost path that leads from router 804 to router 814 and is associated with a delay that is not greater than the specified delay requirement.

In block 504, in response to the request, the delay D associated with the least-delay path between the specified source and the specified destination is determined from information resulting from a routing algorithm. For example, router 804 may determine, from pheromone table 832, the least-delay path from router 804 to router 814. The information in pheromone table 832 results from the Ant Routing Algorithm. Pheromone table 832 indicates the least-delay path between router 804 and router 814, as well as the delay associated with that path.

In block 506, it is determined whether delay D is greater than the specified delay requirement. If delay D is not greater than the specified delay requirement, then control passes to block 510. Otherwise, control passes to block 508.

In block 508, an indication of failure is returned. The indication is that no data packet can be transferred along any path between the specified source and the specified destination within the specified amount of time. If the least-delay path cannot satisfy the delay requirement, then no other path between the specified source and the specified destination can. Therefore, there is no need to examine other paths between the specified source and the specified destination after it is determined that the least-delay path fails to satisfy the delay requirement. When the indication of failure is returned, the request for a connection between the specified source and the specified destination is rejected.

Alternatively, in block 510, a forward QoS ant is sent to the next router on the least-cost path to the specified destination. The least-cost path is stored in the pheromone table as the result of performing a version of the Ant Routing Algorithm in which some forward ants measure cost rather than delay.

In one embodiment, the forward QoS ant indicates the identity of the router from which the forward QoS ant originated, the time at which the forward QoS ant was sent, the specified destination, the delay requirement, a "wrong way" flag, a "temporary timestamp" field, an "accumulated delay" field, and a "QoS identifier." For example, the QoS identifier may be based on the specified source, the specified destination, and an identity of the request received in block 502. The "wrong way" flag initially is set to "false." The "temporary timestamp" field initially is set to the current time. The "accumulated delay" field initially is set to zero.

In block 512, a backward QoS ant that corresponds to the forward QoS ant is received. The process by which backward QoS ants are generated is described below with reference to FIGS. 6A, 6B, and 6C.

In block 514, the identity of the path indicated by the backward QoS ant is returned. This is the path taken by the corresponding forward QoS ant to the specified destination. Due to the process by which forward QoS ants are routed and backward QoS ants are generated, as described below with reference to FIGS. 6A, 6B, and 6C, the path taken by the forward QoS ant and carried by the corresponding backward QoS ant is a low-cost specified-source-to-specified-destination path that is associated with a delay that is not greater than the specified delay requirement.

Figure 6A:
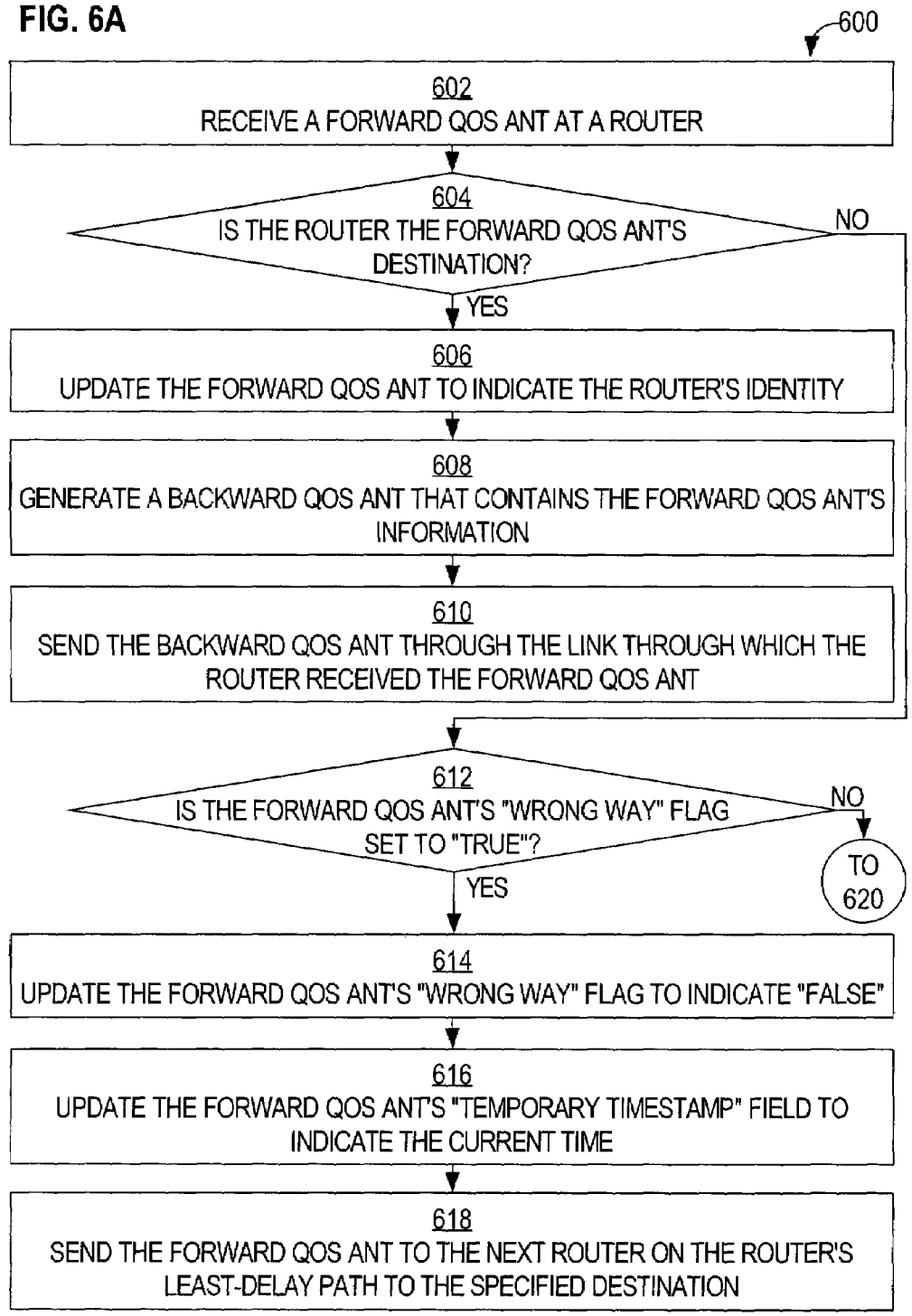
FIGS. 6A, 6B, and 6C are flow diagrams that illustrate one embodiment of a process for handling a forward QoS ant received from another router.
Figure 6B:
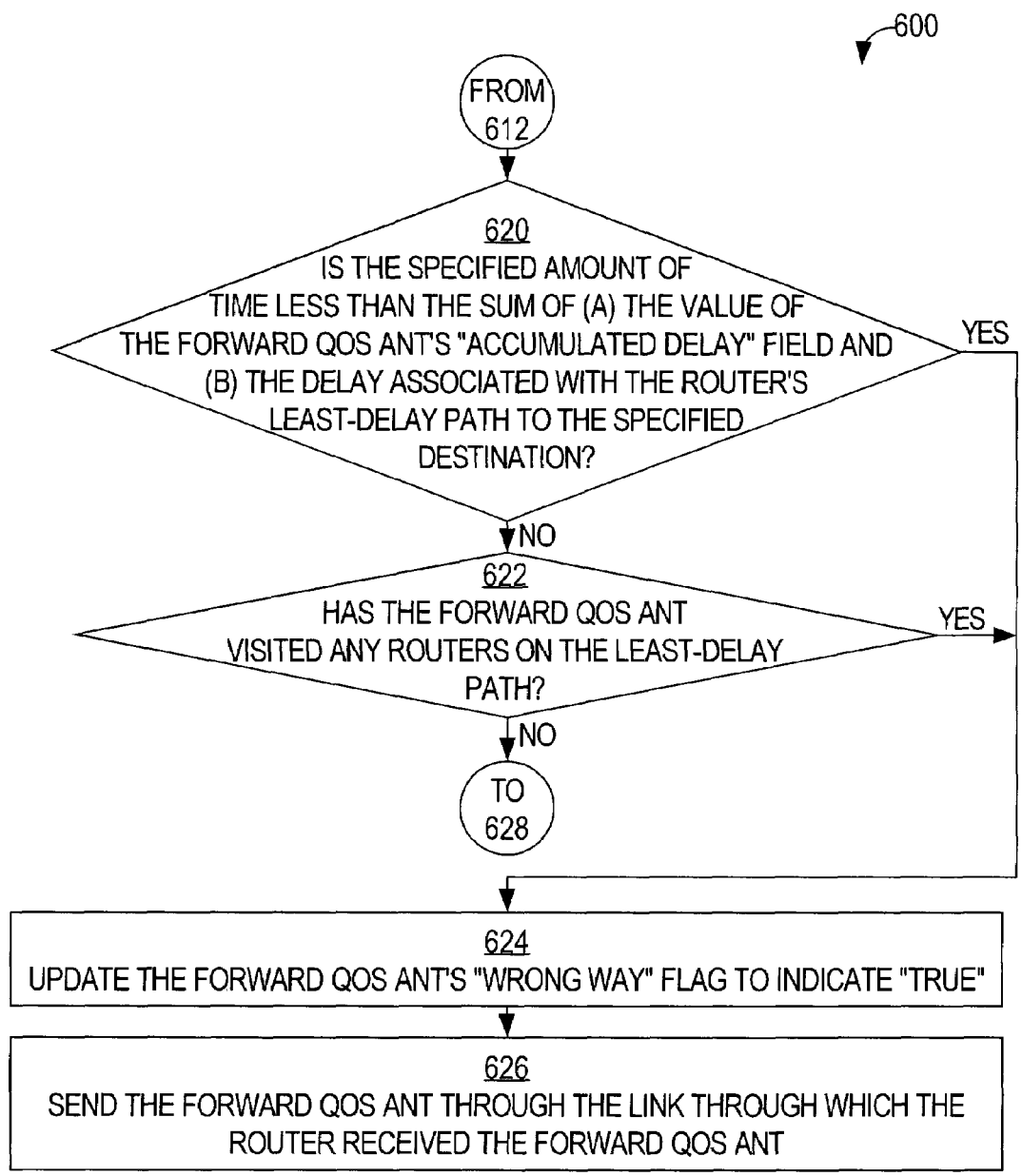
Figure 6C:
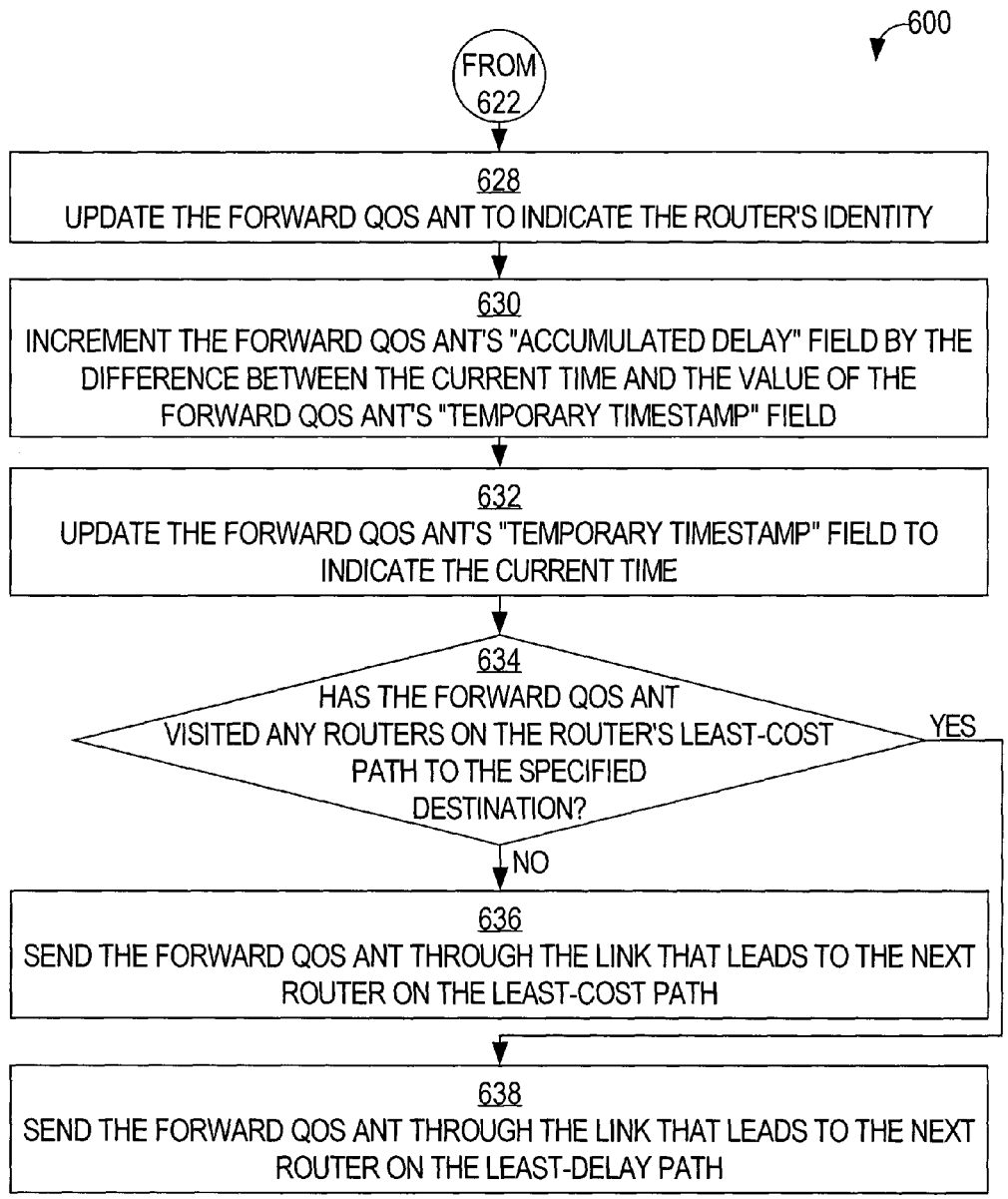

Between the time that a forward QoS is sent from an origin and the time that a corresponding backward QoS ant returns to the origin, multiple routers intermediate to the specified source and the specified destination may receive and forward the forward QoS ant. FIGS. 6A, 6B, and 6C are flow diagrams that illustrate one embodiment of a process 600 for handling a forward QoS ant received from another router.

In block 602, a forward QoS ant is received at a router ("the present router"). For example, router 808 may receive a copy of a forward QoS ant that was sent from router 804.

In block 604, it is determined whether the present router is the forward QoS ant's specified destination. If the present router is the forward QoS ant's specified destination, then control passes to block 606. Otherwise, control passes to block 612.

In block 606, in response to determining that the present router is the forward QoS ant's specified destination, the forward QoS ant is updated to indicate the present router's identity. For example, router 808 may add, to the end of a list contained in the forward QoS ant, the router's identity. As the forward QoS ant travels from router to router, the forward QoS ant records the identities of the routers along the path that the QoS ant travels. The forward QoS ant indicates the order in which it visited each router along the forward QoS ant's path.

In block 608, a backward QoS is generated. The backward QoS ant contains the forward QoS ant's information, including the path traveled by the forward QoS ant.

In block 610, the backward QoS ant is sent through the link through which the present router received the forward QoS ant. For example, if router 812 received the forward QoS ant from router 808, then router 812 sends the corresponding backward QoS ant to router 808. The backward QoS ant travels the reverse of the path traveled by the corresponding forward QoS ant, as indicated by the information contained in the backward QoS ant. Routers receiving the backward QoS ant handle the backward QoS ant as described above with reference to FIG. 4.

Alternatively, in block 612, in response to determining that the present router is not the forward QoS ant's destination, it is determined whether the forward QoS ant's "wrong way" flag is set to "true." If the forward QoS ant's "wrong way" flag is set to "true," then control passes to block 614. Otherwise, control passes to block 620.

In block 614, the forward QoS ant's "wrong way" flag is set to "false."

In block 616, the forward QoS ant's "temporary timestamp" field is updated to indicate the current time.

In block 618, the forward QoS ant is sent through the link that leads to the next router on the present router's least-delay path to the specified destination. Because the pheromone table indicates all routers in a least-delay path, the next router on the least-delay path can be determined by examining the pheromone table.

Alternatively, in block 620, in response to determining in block 612 that the forward QoS ant's "wrong way" flag is not set to "true," it is determined whether the amount of time specified by the delay requirement is less than the sum of (a) the value of the forward QoS ant's "accumulated delay" field and (b) the delay associated with the present router's least-delay path to the specified destination. If the amount of time specified by the delay requirement is not less than this sum, then control passes to block 622. Otherwise, control passes to block 624.

In block 622, in response to determining that the bandwidth associated with the least-delay path is not less than the sum calculated in block 620, it is determined whether the forward QoS ant has visited any routers on the least-delay path, not including the present router. Routers on the least-delay path are indicated in the pheromone table. Routers that the forward QoS ant has visited are indicated in the forward QoS ant. If the forward QoS ant has not visited any routers on the least-delay path, not including the present router, then control passes to block 628. Otherwise, control passes to block 624.

In block 624, the forward QoS ant's "wrong way" flag is set to true.

In block 626, the forward QoS ant is sent back through the link through which the present router received the forward QoS ant. The least-cost path of the previous router either doesn't satisfy the specified delay requirement or results in a loop. Therefore, the previous router will get the forward QoS ant back, and, detecting that the forward QoS ant's "wrong way" path is set to "true," try sending the forward QoS ant through the least-delay path instead.

Alternatively, in block 628, in response to determining in block 622 that the forward QoS ant has not visited any routers on the least-delay path, the forward QoS ant is updated to indicate the present router's identity. For example, the present router may add, to the end of a list contained in the forward QoS ant, the present router's identity.

In block 630, the forward QoS ant's "accumulated delay" field is incremented by the difference between the current time and the value of the forward QoS ant's "temporary timestamp" field. Thus, the forward QoS ant's "accumulated delay" field indicates how long it takes for a data packet to travel from the forward QoS ant's source to the present router.

In block 632, the forward QoS ant's "temporary timestamp" field is updated to indicate the current time. Other routers later may use the value of the "temporary timestamp" field to update the forward QoS ant's "accumulated delay" field.

In block 634, it is determined whether the forward QoS ant has visited any routers on the present router's least-cost path to the specified destination, not including the present router. Routers on the least-cost path are indicated in the present router's pheromone table. Routers that the forward QoS ant has visited are indicated in the forward QoS ant. If the forward QoS ant has not visited any routers on the least-cost path, not including the present router, then control passes to block 636. Otherwise, control passes to block 638.

In block 636, the forward QoS ant is sent through the present router's link that leads to the next router on the present router's least-cost path to the specified destination.

Alternatively, in block 638, the forward QoS ant is sent through the present router's link that leads to the next router on the present router's least-delay path to the specified destination. Because sending the forward QoS ant on the least-cost path would result in a loop, sending the forward QoS ant on the least-delay path is a next-best choice.

Unlike some previous distributed QoS routing approaches, process 600 improves performance by avoiding loops instead of detecting and removing loops.

3.3 QoS Ant Structure

Figure 7:
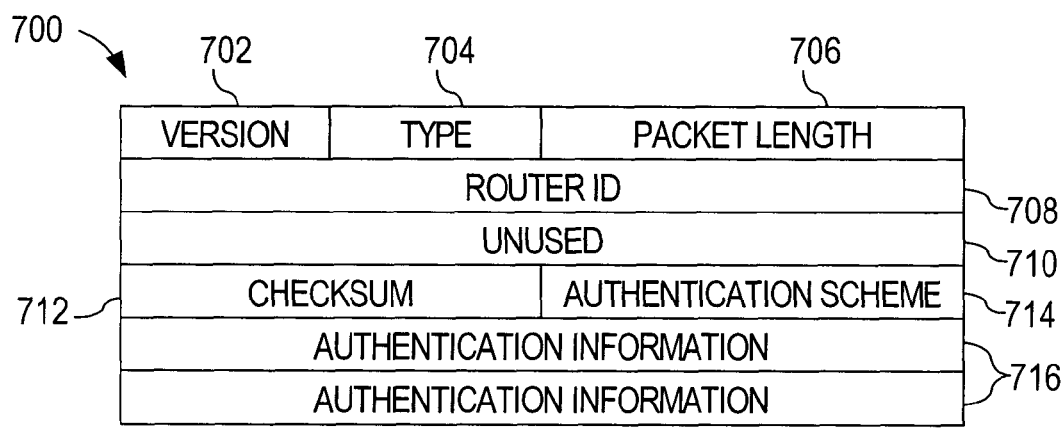
FIG. 7 is a block diagram that illustrates one embodiment of an ant data packet header.

According to one embodiment, each ant is an IP data packet. Each such ant starts with a 24-byte header. FIG. 7 is a block diagram that illustrates one embodiment of an ant data packet header 700. The first byte 702 contains a version number. The second byte 704 contains a type. The type may specify that the ant is a "discovery ant," an "update ant," an "update ant acknowledgement," a regular "forward ant," a regular "backward ant," a "forward QoS ant," or a "backward QoS ant." The third and fourth bytes 706 contain the length of the ant, including the header. The next four bytes 708 identify the router ID of the ant's source. The next four bytes 710 are unused, and set to zero. In one embodiment, bytes 710 are omitted. The next two bytes 712 contain an IP checksum of the contents of the ant, excluding authentication information. The next four bytes 714 identify an authentication procedure to be used when authenticating the ant. The next eight bytes 716 contain authentication information that the specified authentication procedure can use to authenticate the ant.

In addition to header 700, forward QoS ants and backward QoS ants also contain the following information: a source router identifier, a destination router identifier, a QoS requirement, a connection identifier, path information, and, optionally, private data.

The source router identifier identifies the router that originated the forward QoS ant. The destination router identifier identifies the router for which the forward QoS ant is destined. The QoS requirement may include one or more requirements, such as a minimum bandwidth requirement, a maximum delay requirement, a maximum jitter requirement, a maximum cost requirement, etc. Such requirements may be encoded as <type, length, value> triples. The connection identifier identifies a request for a connection that requires the QoS specified in the QoS requirement. The path information indicates the path that the forward QoS ant travels. The path information comprises a sequence of router identifiers that are written to the forward QoS ant by routers along the forward QoS ant's path.

Some QoS ants may contain private data. For example, as described above, a forward QoS ant may contain private data such a "path found" flag, a "wrong way" flag, a "temporary timestamp" field, and/or an "accumulated delay" field.

4.0 Implementation Mechanisms—Hardware Overview

Figure 9:
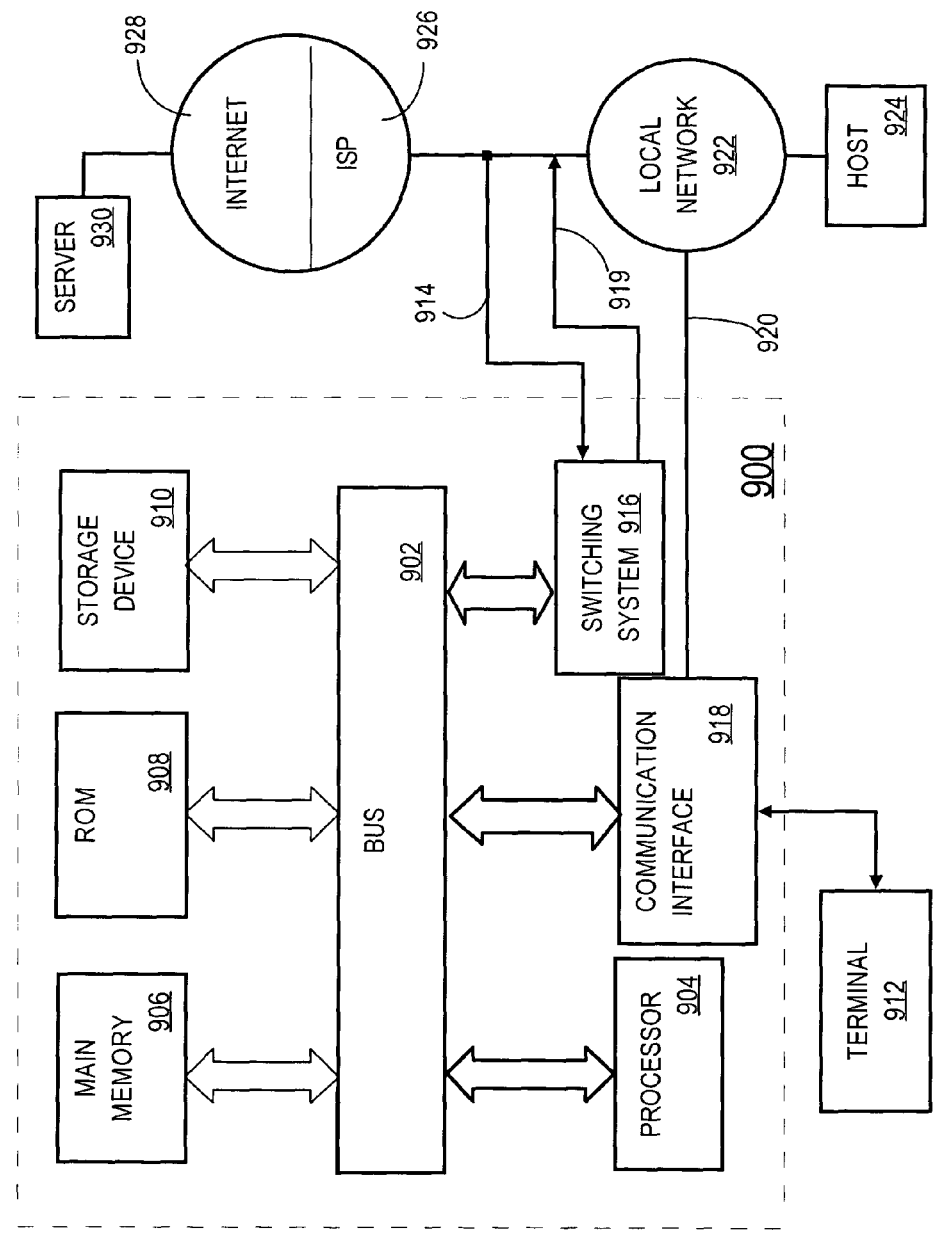
FIG. 9 is a block diagram that illustrates a computer system upon which an embodiment may be implemented.

FIG. 9 is a block diagram that illustrates a computer system 900 upon which an embodiment of the invention may be implemented. The preferred embodiment is implemented using one or more computer programs running on a network element such as a router device. Thus, in this embodiment, the computer system 900 is a router.

Computer system 900 includes a bus 902 or other communication mechanism for communicating information, and a processor 904 coupled with bus 902 for processing information. Computer system 900 also includes a main memory 906, such as a random access memory (RAM), flash memory, or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, flash memory or optical disk, is provided and coupled to bus 902 for storing information and instructions.

A communication interface 918 may be coupled to bus 902 for communicating information and command selections to processor 904. Interface 918 is a conventional serial interface such as an RS-232 or RS-422 interface. An external terminal 912 or other computer system connects to the computer system 900 and provides commands to it using the interface 914. Firmware or software running in the computer system 900 provides a terminal interface or character-based command interface so that external commands can be given to the computer system.

A switching system 916 is coupled to bus 902 and has an input interface 914 and an output interface 919 to one or more external network elements. The external network elements may include a local network 922 coupled to one or more hosts 924, or a global network such as Internet 928 having one or more servers 930. The switching system 916 switches information traffic arriving on input interface 914 to output interface 919 according to pre-determined protocols and conventions that are well known. For example, switching system 916, in cooperation with processor 904, can determine a destination of a packet of data arriving on input interface 914 and send it to the correct destination using output interface 919. The destinations may include host 924, server 930, other end stations, or other routing and switching devices in local network 922 or Internet 928.

The invention is related to the use of computer system 900 for discovering a network path that satisfies a QoS requirement. According to one embodiment of the invention, computer system 900 provides for such updating in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Communication interface 918 also provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for discovering a network path that satisfies a QoS requirement as described herein.

Processor 904 may execute the received code as it is received and/or stored in storage device 910 or other non-volatile storage for later execution. In this manner, computer system 900 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of discovering a network path that satisfies a quality of service (QoS) requirement, the method comprising:
   receiving, at a first router, a first data packet that indicates a destination and said QoS requirement;
   updating said first data packet to indicate an identity of said first router;
   determining whether a least-delay path from said first router to said destination satisfies said QoS requirement;
   determining whether said first data packet has visited any router in said least-delay path other than said first router;
   wherein a first set of routers that are on said least-delay path is in a pheromone table on the first router, and wherein a second set of routers that have been visited by said first data packet is indicated in said first data packet;
   if said least-delay path satisfies said QoS requirement and said first data packet has not visited any router in said least-delay path other than said first router, then sending said first data packet to a second router in said least-delay path; and
   receiving, at said first router, a second data packet that indicates a path taken by said first data packet to said destination.

2. The method of claim 1, wherein said first router has links, and further comprising:
   if said least-delay path does not satisfy said QoS requirement, then performing steps comprising:
   determining one or more of said first router's links that satisfy said QoS requirement; and
   sending a copy of said first data packet through said one or more of said first router's links that satisfy said QoS requirement.

3. The method of claim 1, wherein said first router has links, and further comprising:
   if said first data packet has visited a router in said least-delay path other than said first router, then performing steps comprising:
   determining one or more of said first router's links that satisfy said QoS requirement; and
   sending a copy of said first data packet through said one or more of said first router's links that satisfy said QoS requirement.

4. The method of claim 1, further comprising:
   in response to receiving said first data packet, updating a table to indicate that said first router has received a copy of said first data packet.

5. A computer-implemented method of discovering a network path that satisfies a quality of service (QoS) requirement, the method comprising:
   receiving, at a first router, a data packet that indicates a destination and said QoS requirement;
   determining whether said data packet indicates that a path to said destination has been found;
   determining whether a least-delay path from said first router to said destination satisfies said QoS requirement;
   wherein a first set of routers that are on said least-delay path is in a pheromone table on the first router, and wherein a second set of routers that have been visited by said first data packet is indicated in said first data packet;
   if said data packet indicates that a path to said destination has been found, and if said least-delay path from said first router to said destination does not satisfy said QoS requirement, then eliminating said data packet; and if said data packet does not indicate that a path to said destination has been found, and if said least-delay path from said first router to said destination satisfies said QoS requirement, then performing steps comprising:
   updating said data packet to indicate that a path to said destination has been found; and
   sending said data packet through said link that leads to said second router on said least-delay path.

6. A computer-implemented method of discovering a network path that satisfies a quality of service (QoS) requirement, the method comprising:
   receiving, at a first router that has links, a data packet that indicates a destination and said QoS requirement;
   determining whether said first router previously has received a copy of said data packet;
   if said first router previously has received a copy of said data packet, then eliminating said data packet; and
   if said first router previously has not received a copy of said data packet, then performing steps comprising:
      updating a table to indicate that said first router has received a copy of said data packet;
      determining whether said data packet indicates that a path to said destination has been found;
      determining whether a least-delay path from said first router to said destination satisfies said QoS requirement;
      if said data packet indicates that a path to said destination has been found, then performing steps comprising:
         if said least-delay path from said first router to said destination does not satisfy said QoS requirement, then eliminating said data packet; and
         if said least-delay path from said first router to said destination satisfies said QoS requirement, then sending said data packet through a link that leads to a second router on said least-delay path; and
      if said data packet does not indicate that a path to said destination has been found, then performing steps comprising:
         determining one or more of said first router's links that satisfy said QoS requirement;
         if said least-delay path from said first router to said destination does not satisfy said QoS requirement, then sending a copy of said data packet through said one or more of said first router's links that satisfy said QoS requirement; and
         if said least-delay path from said first router to said destination satisfies said QoS requirement, then performing steps comprising:
            determining whether said data packet has visited any router in said least-delay path other than said first router;
            if said data packet has visited a router in said least-delay path other than said first router, then sending a copy of said data packet through said one or more of said first router's links that satisfy said QoS requirement; and
            if said data packet has not visited any router in said least-delay path other than said first router, then performing steps comprising:
               updating said data packet to indicate that a path to said destination has been found; and
               sending said data packet through said link that leads to said second router on said least-delay path.

7. A computer-readable storage medium carrying one or more sequences of instructions for discovering a network path that satisfies a quality of service (QoS) requirement, which instructions, when executed by one or more processors, cause the one or more processors to carry out the steps of:
   receiving, at a first router, a first data packet that indicates a destination and said QoS requirement;
   updating said first data packet to indicate an identity of said first router;
   determining whether a least-delay path from said first router to said destination satisfies said QoS requirement;
   determining whether said first data packet has visited any router in said least-delay path other than said first router;
   wherein a first set of routers that are on said least-delay path is in a pheromone table on the first router, and wherein a second set of routers that have been visited by said first data packet is indicated in said first data packet;
   if said least-delay path satisfies said QoS requirement and said first data packet has not visited any router in said least-delay path other than said first router, then sending said first data packet to a second router in said least-delay path; and
   receiving, at said first router, a second data packet that indicates a path taken by said first data packet to said destination.

8. The computer-readable storage medium of claim 7, wherein said first router has links, and wherein said instructions, when executed by the one or more processors, cause the one or more processors to carry out the steps of:
   if said least-delay path does not satisfy said QoS requirement, then performing steps comprising:
      determining one or more of said first router's links that satisfy said QoS requirement; and
      sending a copy of said first data packet through said one or more of said first router's links that satisfy said QoS requirement.

9. The computer-readable storage medium of claim 7, wherein said first router has links, and wherein said instructions, when executed by the one or more processors, cause the one or more processors to carry out the steps of:
   if said first data packet has visited a router in said least-delay path other than said first router, then performing steps comprising:
      determining one or more of said first router's links that satisfy said QoS requirement; and
      sending a copy of said first data packet through said one or more of said first router's links that satisfy said QoS requirement.

10. The computer-readable storage medium of claim 7, wherein said instructions, when executed by the one or more processors, cause the one or more processors to carry out the steps of:
   in response to receiving said first data packet, updating a table to indicate that said first router has received a copy of said first data packet.

11. An apparatus for discovering a network path that satisfies a quality of service (QoS) requirement, comprising:
   means for receiving, at a first router, a first data packet that indicates a destination and said QoS requirement;
   means for updating said first data packet to indicate an identity of said first router;
   means for determining whether a least-delay path from said first router to said destination satisfies said QoS requirement;
   means for determining whether said first data packet has visited any router in said least-delay path other than said first router;
   wherein a first set of routers that are on said least-delay path is in a pheromone table on the first router, and wherein a second set of routers that have been visited by said first data packet is indicated in said first data packet;

means for sending said first data packet to a second router in said least-delay path if said least-delay path satisfies said QoS requirement and said first data packet has not visited any router in said least-delay path other than said first router; and means for receiving, at said first router, a second data packet that indicates a path taken by said first data packet to said destination.

12. The apparatus of claim 11, wherein said first router has links, and further comprising:

means for determining one or more of said first router's links that satisfy said QoS requirement if said least-delay path does not satisfy said QoS requirement; and means for sending a copy of said first data packet through said one or more of said first router's links that satisfy said QoS requirement if said least-delay path does not satisfy said QoS requirement.

13. The apparatus of claim 11, wherein said first router has links, and further comprising:

means for determining one or more of said first router's links that satisfy said QoS requirement if said first data packet has visited a router in said least-delay path other than said first router; and means for sending a copy of said first data packet through said one or more of said first router's links that satisfy said QoS requirement if said first data packet has visited a router in said least-delay path other than said first router.

14. The apparatus of claim 11, further comprising:

means for updating, in response to receiving said first data packet, a table to indicate that said first router has received a copy of said first data packet.

15. An apparatus for discovering a network path that satisfies a quality of service (QoS) requirement, comprising:

a network interface that is coupled to a data network for receiving one or more packet flows therefrom;

a processor;

one or more stored sequences of instructions which, when executed by the processor, cause the processor to carry out the steps of:

receiving, at said apparatus, a first data packet that indicates a destination and said QoS requirement;

updating said first data packet to indicate an identity of said apparatus;

determining whether a least-delay path from said apparatus to said destination satisfies said QoS requirement;

determining whether said first data packet has visited any router in said least-delay path other than said first router;

wherein a first set of routers that are on said least-delay path is in a pheromone table on the first router, and wherein a second set of routers that have been visited by said first data packet is indicated in said first data packet;

if said least-delay path satisfies said QoS requirement and said first data packet has not visited any router in said least-delay path other than said apparatus, then sending said first data packet to a router in said least-delay path; and receiving, at said apparatus, a second data packet that indicates a path taken by said first data packet to said destination.

16. The apparatus of claim 15, wherein said apparatus has links, and wherein said instructions, when executed by the processor, cause the processor to carry out the steps of:

if said least-delay path does not satisfy said QoS requirement, then performing steps comprising:

determining one or more of said apparatus' links that satisfy said QoS requirement; and sending a copy of said first data packet through said one or more of said apparatus' links that satisfy said QoS requirement.

17. The apparatus of claim 15, wherein said apparatus has links, and wherein said instructions, when executed by the processor, cause the processor to carry out the steps of:

if said first data packet has visited a router in said least-delay path other than said apparatus, then performing steps comprising:

determining one or more of said apparatus' links that satisfy said QoS requirement; and sending a copy of said first data packet through said one or more of said apparatus' links that satisfy said QoS requirement.

18. The apparatus of claim 15, wherein said instructions, when executed by the processor, cause the processor to carry out the steps of:

in response to receiving said first data packet, updating a table to indicate that said apparatus has received a copy of said first data packet.

* * * * *

UNITED STATES PATENT AND TRADEMARK OFFICE
CERTIFICATE OF CORRECTION

PATENT NO. : 7,466,655 B1 Page 1 of 1
APPLICATION NO. : 10/665190
DATED : December 16, 2008
INVENTOR(S) : Fuyong Zhao It is certified that error appears in the above-identified patent and that said Letters Patent is hereby corrected as shown below:

On the title page item (54) and Col. 1, line 3,

Delete "EQUIPMENT" and insert therefor --REQUIREMENT--

Signed and Sealed this

Twenty-third Day of June, 2009

JOHN DOLL
*Acting Director of the United States Patent and Trademark Office*